United States Patent
Kuroki

(10) Patent No.: US 9,519,945 B2
(45) Date of Patent: Dec. 13, 2016

(54) IMAGE PROCESSING APPARATUS, CONTROL METHOD, AND PROGRAM THEREFOR

(71) Applicant: CANON KABUSHIKI KAISHA, Tokyo (JP)

(72) Inventor: Daisuke Kuroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 14/477,730

(22) Filed: Sep. 4, 2014

(65) Prior Publication Data
US 2015/0070384 A1    Mar. 12, 2015

(30) Foreign Application Priority Data

Sep. 6, 2013 (JP) ................................. 2013-185312

(51) Int. Cl.
  *G09G 5/00* (2006.01)
  *G06T 1/20* (2006.01)
(52) U.S. Cl.
  CPC ....................................... *G06T 1/20* (2013.01)
(58) Field of Classification Search
  None
  See application file for complete search history.

(56) References Cited

U.S. PATENT DOCUMENTS

| 8,675,002 B1* | 3/2014 | Andonieh | G06F 15/167 345/505 |
| 2009/0303245 A1* | 12/2009 | Soupikov | G06T 15/005 345/582 |
| 2010/0134498 A1* | 6/2010 | Pirzadeh | G06T 17/205 345/441 |
| 2011/0175930 A1* | 7/2011 | Hwang | G06F 3/0481 345/629 |
| 2013/0076761 A1* | 3/2013 | Ellis | G06F 15/16 345/502 |

FOREIGN PATENT DOCUMENTS

| CN | 102129345 A | 7/2011 |
| JP | 2010-162745 A | 7/2010 |

* cited by examiner

*Primary Examiner* — Ryan R Yang
(74) *Attorney, Agent, or Firm* — Canon U.S.A., Inc. IP Division

(57) ABSTRACT

A graphic division unit divides image data to be output into a plurality of divided regions, and an order determination unit determines a generation order of a plurality of the divided regions of the image data so as to cause a first generation order of the image data and a second generation order of the image data to be different from each other. A generation stop instruction unit causes generation of the image data until the image data combining the image data generated based on the first generation order with the image data generated based on the second generation order corresponds to the image data to be output.

18 Claims, 8 Drawing Sheets

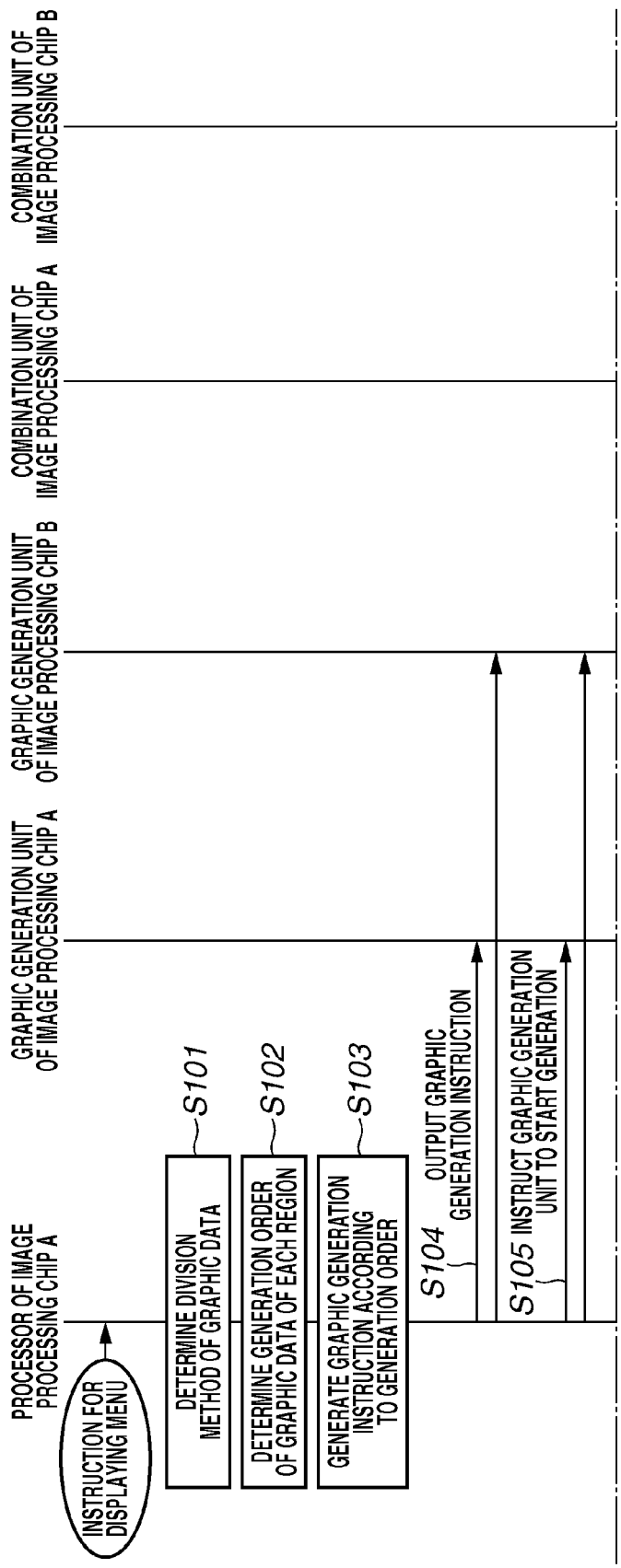

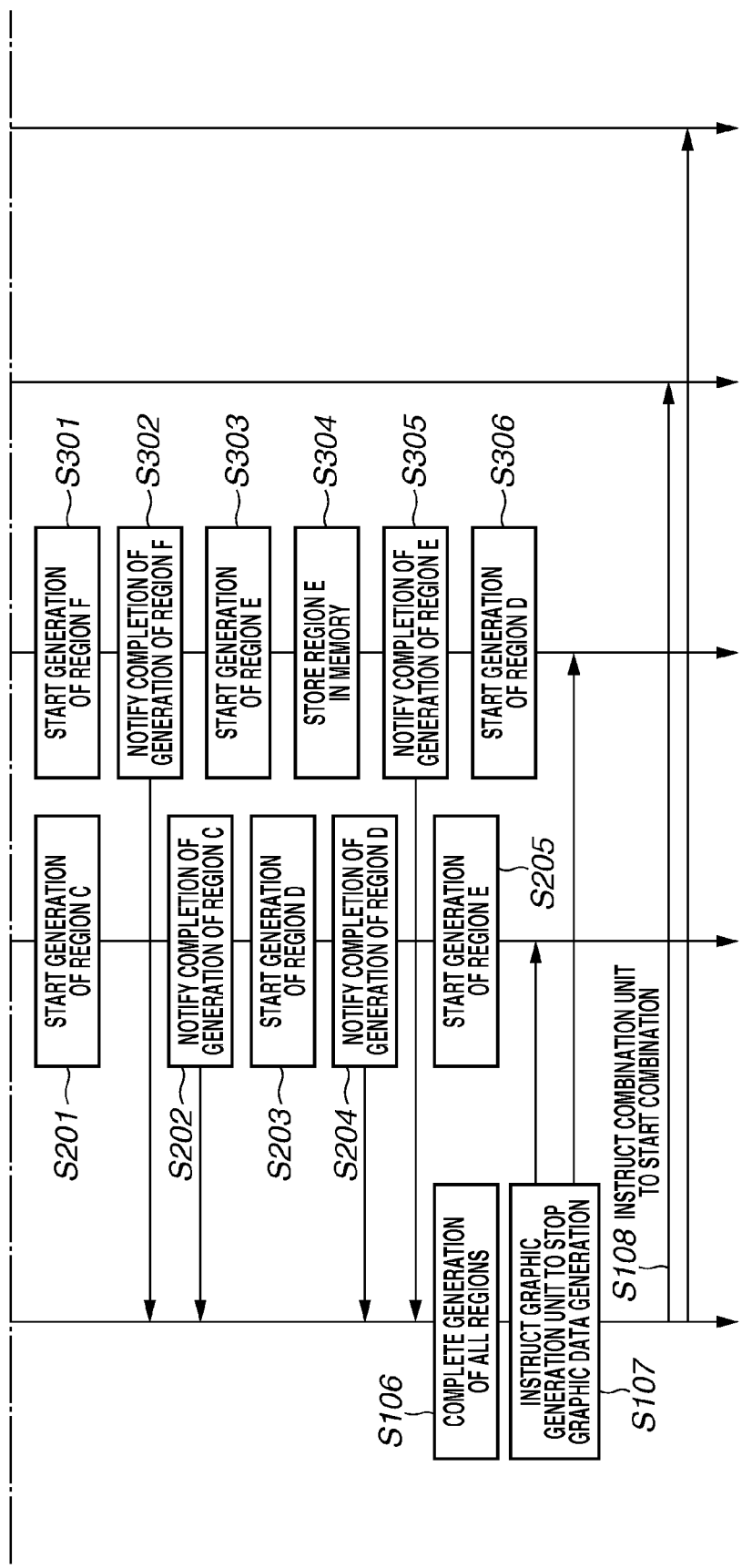

IMAGE PROCESSING APPARATUS, CONTROL METHOD, AND PROGRAM THEREFOR

BACKGROUND

Field

Aspects of the present invention generally relate to a method for generating image data through a plurality of generation units.

Description of the Related Art

At present, full high-definition (HD) (1920×1080) is generally employed as definition of digital televisions. However, standardization of image data at higher-definition such as 4K2K (4096×2160) and super hi-vision (or ultra-high definition) (7680×4320) is in progress, so that devices capable of displaying these high-definition image data are now being provided.

In order to execute various processing of the high-definition image data such as receiving processing, image processing, and output processing to display devices, an image input-output interface and a memory interface having wider band are necessary. Further, there may be a case where the above processing cannot be executed by a single image processing large-scale integration (LSI) chip because a calculation amount thereof has been increased. Therefore, in order to execute the receiving processing, the image processing, and the output processing of the high-definition image data, there is provided a method in which the image processing is executed in a unit of divided image data by spatially dividing the high-definition image data. For example, by dividing the high-definition image data into a right-half and a left-half portion, the image processing of the divided portions of image data may be concurrently executed by two image processing LSI chips.

In addition, the image processing LSI chip executes the processing other than the image data processing. In other words, the image processing LSI chip also includes a function of generating graphic data such as information relating to displayed image data, a setting menu, a Web screen, or a photograph and outputting the image data by superimposing the graphic data on the image data. Because higher definition is employed for the image data, definition of the graphic data to be superimposed thereon is also higher, and thus the calculation amount of the graphic data generation processing is increased. Therefore, in a same manner as the image processing of the high-definition image data, the graphic data is also generated by using graphic generation units included in a plurality of the image processing LSI chips.

Japanese Patent Application Laid-Open No. 2010-162745 discusses a technique for improving the speed of distributed processing. In the technique, processing is distributed to a plurality of processing units to make respective processing loads uniform by estimating the processing load for the image formation of the graphic data that is divided into rectangular-shaped image blocks.

However, differently from the high-definition image data, a display region of the graphic data to be superimposed may not be constant. In other words, the graphic data may be displayed on the entire region, displayed mainly on a left-half region, or displayed only on the left-half region. Furthermore, the processing load of the graphic data generation is not constant in the entire region of the graphic data. For example, in a case where the graphic data includes a region configured of complex image data such as a photograph and a region simply configured of text data, the processing load of the graphic data generation is larger in the region configured of the image data than in the region configured of the text data. Therefore, if the graphic data generation processing is distributed according to a boundary between divided regions of the high-definition image data, the processing load thereof may be concentrated in a graphic generation unit of one image processing chip. In such a case, even though a plurality of graphic generation units is employed therefor, the processing loads thereof cannot be uniform, and thus efficiency of generating the graphic data will be reduced. This may result in reduction of graphic data display speed.

Further, with the configuration discussed in Japanese Patent Application Laid-Open No. 2010-162745, processing for estimating the processing load of the graphic data will be necessary. Furthermore, with the technique discussed in Japanese Patent Application Laid-Open No. 2010-162745, in addition to a result of the above estimation, it is necessary to allocate the graphic data generation processing while taking a display region of the graphic data into consideration. Accordingly, the processing load for determining the allocation of the graphic data generation processing is increased, thus the display speed of the graphic data is reduced.

SUMMARY

An image processing apparatus controlling generation of image data includes a division unit configured to divide image data to be output into a plurality of divided regions, a determination unit configured to determine a generation order of a plurality of the divided regions of image data such that a first generation order executed by a first generation unit and a second generation order executed by a second generation unit are different from each other, and a control unit configured to cause the first and the second generation units to generate the image data until the image data combining image data generated by the first generation unit based on the determined first generation order with the image data generated by the determined second generation unit based on the second generation order corresponds to the image data to be output.

Further features of the present disclosure will become apparent from the following description of exemplary embodiments with reference to the attached drawings.

BRIEF DESCRIPTION OF THE DRAWINGS

FIG. 2 is a sequence diagram illustrating a processing flow of the image processing system according to the present exemplary embodiment.

DESCRIPTION OF THE EMBODIMENTS

Various exemplary embodiments will be described in detail below with reference to the drawings.

Hereinafter, an exemplary embodiment embodying the present disclosure will be described in detail with reference to the appended drawings.

Figure 1:
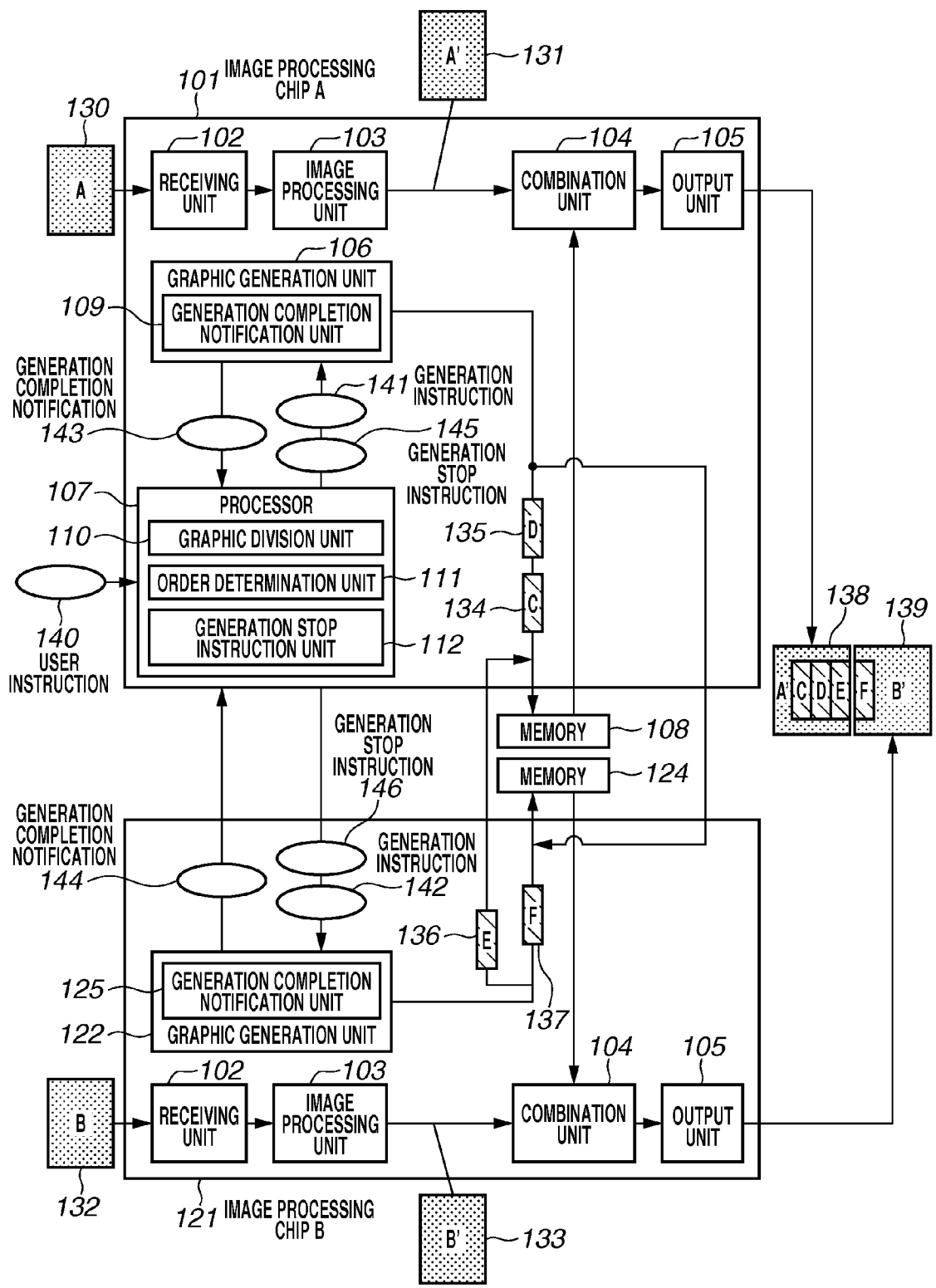
FIG. 1 is a block diagram illustrating a configuration of an image processing system according to a present exemplary embodiment.

FIG. 1 is a block diagram illustrating a configuration of an image processing system according to the first exemplary embodiment. In the image processing system according to the first exemplary embodiment, high-definition image data is divided into two regions of image data (divided image data), and image processing of the divided regions of image data is concurrently executed by two image processing chips.

In FIG. 1, an image processing chip A 101 includes a function of outputting image data to a display device after superimposing graphic data (predetermined image data) on the image data (input image data) by executing image processing and graphic generation processing. As illustrated in FIG. 1, the image processing chip A 101 includes a receiving unit 102 for receiving the image data (input image data), an image processing unit 103 for executing predetermined processing on the image data, and a processor 107 for controlling the graphic data generation processing. The image processing chip A 101 further includes a graphic generation unit 106 for executing the graphic data generation processing, a combining unit 104 for superimposing the graphic data (predetermined image data) on the image data (input image data), and an output unit 105 for outputting the image data (display image data) to the display device. A memory 108 is a memory corresponding to the image processing chip A 101. Further, the processor 107 includes a graphic division unit 110, an order determination unit 111, and a generation stop instruction unit 112. The graphic generation unit 106 includes a generation completion notification unit 109.

In order to process the high-definition image data, the image processing system according to the present exemplary embodiment includes two chips, the image processing chip A 101 and an image processing chip B 121 that is equivalent to the image processing chip A 101. The image processing chip A 101 processes a left-half display region of the display device. In other words, the image processing chip A 101 executes image processing of the image data (hereinafter, referred to as "left-side image data") 130 displayed on the left-half display region of the display device, combines the image-processed left-side image data 131 with the graphic data, and outputs that combined image data to the display device. More specifically, the receiving unit 102 receives the left-side image data 130 and outputs the left-side image data 130 to the image processing unit 103. The image processing unit 103 executes image processing such as interlace progressive (IP) conversion or edge enhancement on the left-side image data 130, and outputs the image-processed left-side image data 131 to the combination unit 104. The combination unit 104 reads the graphic data from the memory 108 and generates left-side display image data 138 by superimposing the graphic data on the image-processed left-side image data 131. Then, the combination unit 104 outputs the left-side display image data 138 to the output unit 105. The output unit 105 displays the left-side display image data 138 by outputting the image data 138 for the left-side display to the display device. In FIG. 1, each of a region C, a region D, and a region E in the image data 138 for the left-side display is the combined graphic data which is superimposed on the image-processed left-side image data 131.

Likewise, the image processing chip B 121 processes a right-half display region of the display device. In other words, the image processing chip B 121 executes image processing of image data (hereinafter, referred to as "right-side image data") 132 to be displayed on the right-half display region of the display device. Then, after combining the image-processed right-side image data 133 with the graphic data, the image processing chip B 121 outputs that combined image data to the display device as the right-side display image data 139. In FIG. 1, a region F in the right-side display image data 139 is the combined graphic data superimposed on the image-processed right-side image data 133.

A memory 124 is a memory corresponding to the image processing chip B 121. In other words, graphic data that is to be combined with the image-processed right-side image data 133 is the graphic data read from the memory 124. In addition, a receiving unit 102, an image processing unit 103, a combination unit 104, and an output unit 105 of the image processing chip B 121 are configured in a same manner as the receiving unit 102, the image processing unit 103, the combination unit 104 and the output unit 105 of the image processing chip A 101. A graphic generation unit 122 includes a generation completion notification unit 125.

The display device combines the left-side display image data 138 and the right-side display image data 139 to display that combined image data as one high-definition image data. In the present exemplary embodiment, for the sake of simplicity, the memories 108 and 124 serve as memories for storing the graphic data. However, in practice, the memories 108 and 124 are also used as frame memories in which the image processing units 103 of the image processing chip A 101 and the image processing chip B 121 store the image data.

A user instruction 140 input through a remote controller or a keyboard is input to the processor 107 of the image processing chip A 101. The graphic data may be information relating to the displayed image data, a setting menu, a Web screen, or a photograph, and thus a display size or a display position thereof may vary accordingly. The graphic data may be displayed across the boundary between the divided regions of high-definition image data, or may be displayed on only one of the divided regions thereof.

The processor 107 determines the graphic data to be generated based on the user instruction 140, and converts that user instruction 140 into a graphic generation instruction readable by the graphic generation units 106 and 122. A run-length instruction in which a string of consecutive identical symbols is replaced with a number that indicates a length of the string of symbols can be given as an example of the graphic generation instruction. Generally, the graphic generation instruction is converted according to the property of graphic data such as a figure, a character, or a photograph, while an instruction format thereof is properly changed for respective portions of the graphic data in order to generate the graphic data efficiently. In addition, a method for generating a graphic generation instruction in a unit of divided portion by dividing the graphic data into a plurality of portions is publicly known, and thus detailed descriptions thereof will be omitted.

The graphic generation units 106 and 122 receive the graphic generation instructions and generate graphic data such as bitmap data. Each of the graphic generation units 106 and 122 may be configured of a processor and firmware in order to flexibly deal with change in the specification of the graphic generation instruction, or may be fully configured of hardware placing priority on high-speed graphic generation.

The processor 107 of the image processing chip A 101 controls graphic data generation processing of the entire image processing system. In other words, the processor 107 of the image processing chip A 101 generates the graphic data by controlling the graphic generation unit 106 of the image processing chip A 101 and the graphic generation unit 122 of the image processing chip B 121.

Each of the graphic generation units 106 and 122 temporarily stores the generated graphic data in the memory 108 or 124 corresponding to its own image processing chip A 101 or B 121. Thereafter, in a case where the generated graphic data is to be combined with a region of the image data processed by other image processing chip A101 or B 121, each of the graphic generation units 106 and 122 transfers that generated graphic data to the memory 108 or 124 corresponding to the other image processing chip A101 or B 121. For example, in a case where the graphic generation unit 122 of the image processing chip B 121 generates the graphic data of the region E 136 and the region F 137 and stores the graphic data in the memory 124, the graphic data of the region E 136 is to be combined with the image-processed left-side image data 131. Therefore, the graphic data of the region E 136 is transferred to the memory 108 of the image processing chip A 101 from the memory 124 of the image processing chip B 121.

A general communication pathway for executing parallel processing among a plurality of chips, such as a peripheral component interconnect (PCI) bus or a serial communication, is used for communication between the processor 107 of the image processing chip A 101 and the graphic generation unit 122 of the image processing chip B 121. Likewise, in order to refer to the data stored in another image processing chip in the image processing, the image processing chip A 101 and the image processing chip B 121 are normally connected to each other through a high-speed data transmission bus such as a PCI Express, so that the image processing chip can access the memory of another image processing chip. Therefore, the image processing chip A 101 can access the memory 124 corresponding to the image processing chip B 121. Likewise, the image processing chip B 121 can access the memory 108 corresponding to the image processing chip A 101. The graphic data of the region E 136 is transferred from the memory 124 to the memory 108 through the above-described communication pathway.

The graphic division unit 110, the order determination unit 111, and the generation stop instruction unit 112 may be installed in the processor 107 as hardware, or may be implemented by software operating on the processor 107. The graphic division unit 110 divides the generated graphic data into a region that is to be a generation unit of the graphic generation unit 106 or 122. When the graphic data is to be divided, the graphic data is divided at least at a boundary between the image data if the region of the graphic data is positioned across the boundary between the divided image data. For example, as illustrated in FIG. 1, when the graphic data is to be divided into a region C, a region D, a region E, and a region F, the region E and the region F will be divided based on the boundary between the left-side display image data 138 and the right-side display image data 139. The boundary between the image data is an example of an edge of the image data.

The order determination unit 111 determines a generation order by the graphic generation units 106 and 122 of the graphic data of the region C, the region D, the region E, and the region F, divided by the graphic division unit 110. In other words, the order determination unit 111 determines the generation order so that the image processing chip A 101 generates the graphic data from the region on the left-side display image data 138 toward the boundary between the left-side display image data 138 and the right-side display image data 139. On the other hand, the order determination unit 111 determines the generation order so that the image processing chip B 121 generates the graphic data from the region on the right-side display image data 139 toward the boundary between the left-side display image data 138 and the right-side display image data 139. More specifically, the order determination unit 111 makes a determination such that the image processing chip A 101 generates the graphic data in the order of the region C, the region D, the region E, and the region F. On the other hand, the order determination unit 111 makes a determination such that the image processing chip B 121 generates the graphic data in the order of the region F, the region E, the region D, and the region C.

Based on the method for dividing the graphic data, determined by the graphic division unit 110, the processor 107 generates graphic generation instructions 141 and 142 for respective regions. Then, the graphic division unit 110 notifies the graphic generation instructions 141 and 142 to the graphic generation units 106 and 122 to generate the respective regions of the graphic data according to the order determined by the order determination unit 111. In other words, the processor 107 outputs the graphic generation instructions 141 corresponding to the respective regions to the graphic generation unit 106 according to the order determined by the order determination unit 111. Likewise, the processor 107 outputs the graphic generation instructions 142 corresponding to the respective regions to the graphic generation unit 122 according to the order determined by the order determination unit 111.

When each of the graphic generation units 106 and 122 receives the graphic generation instructions 141 or 142, the graphic generation units generate the graphic data according to the receiving order of the graphic generation instructions 141 or 142, and stores the generated graphic data in the memory 108 or 124 corresponding to its own image processing chips A 101 or B 121. Each of the graphic generation unit 106 and 122 (i.e., generation completion notification units 109 and 125) outputs a graphic generation completion notification 143 or 144 to the processor 107 every time the processing for generating each region of the graphic data and the processing for storing each region of the graphic data in the memory 108 or 124 are completed.

When the processor 107 has received the graphic generation completion notifications 143 and 144 for all the regions of the graphic data from the graphic generation units 106 and 122, the generation stop instruction unit 112 outputs graphic generation stop instructions 145 and 146 to the graphic generation units 106 and 122. Then, the processor 107 instructs the combination unit 104 of the image processing chip A 101 to superimpose the graphic data stored in the memory 108 on the left-side image data 131. Further, the processor 107 instructs the combination unit 104 of the image processing chip B 121 to superimpose the graphic data stored in the memory 124 on the right-side image data 133.

Next, a processing flow of the image processing system according to the present exemplary embodiment will be described with reference to FIG. 2. The processing illustrated in FIG. 2 will be realized when a central processing unit (CPU) within the processor 107 reads and executes necessary programs or data stored in a storage medium such as a read only memory (ROM).

First, the user instruction 140 for displaying a menu screen is input to the processor 107 of the image processing chip A 101. In step S101, the graphic division unit 110 determines a method for dividing the graphic data based on the user instruction 140.

In step S102, the order determination unit 111 determines a generation order of respective regions of the graphic data based on the dividing method determined by the graphic division unit 110. The generation orders of the graphic data are determined respectively for the graphic generation units 106 and 122. In step S103, the processor 107 generates graphic generation instructions 141 and 142 corresponding to the respective regions of the graphic data according to the generation order determined by the order determination unit 111.

In step S104, the processor 107 outputs the graphic generation instructions 141 corresponding to the respective regions of the graphic data to cause the graphic generation unit 106 to generate the graphic data in the order of the region C, the region D, the region E, and the region F. Further, the processor 107 outputs the graphic generation instructions 142 corresponding to the respective regions of the graphic data to cause the graphic generation unit 122 to generate the graphic data in the order of the region F, the region E, the region D, and the region C. In step S105, the processor 107 instructs the graphic generation units 106 and 122 to start generating the graphic data. In response to the instruction, the graphic generation units 106 and 122 start the generation of the graphic data respectively.

In step S201, the graphic generation unit 106 starts generating the graphic data of the region C 134. In step S202, the graphic generation unit 106 ends the generation of the graphic data of the region C 134, stores the generated graphic data in the memory 108, and outputs the graphic generation completion notification 143 to the processor 107. In step S203, the graphic generation unit 106 starts generating the graphic data of the region D 135. In step S204, the graphic generation unit 106 ends the generation of the graphic data of the region D 135, stores the generated graphic data in the memory 108, and outputs the graphic generation completion notification 143 to the processor 107. In step S205, the graphic generation unit 106 starts generating the graphic data of the region E 136.

In step S301, the graphic generation unit 122 starts generating the graphic data of the region F 137. In step S302, the graphic generation unit 122 ends the generation of the graphic data of the region F 137, stores the generated graphic data in the memory 124, and outputs the graphic generation completion notification 144 to the processor 107.

In step S303, the graphic generation unit 122 starts generating the graphic data of the region E 136. In step S304, the graphic generation unit 122 ends the generation of the graphic data of the region E 136, and stores the generated graphic data in the memory 124. In step S304, because the graphic data of the region E 136 is to be processed by the image processing chip A 101, the graphic generation unit 122 transfers the graphic data of the region E 136 from the memory 124 to the memory 108.

After the graphic data of the region E 136 has been stored in the memory 108, in step S305, the graphic generation unit 122 outputs the graphic generation completion notification 144 to the processor 107. In step S306, the graphic generation unit 122 starts generating the graphic data of the region D 135.

In step S106, the processor 107 receives the graphic generation completion notifications 143 and 144 for the graphic data of all the regions C, D, E, and F, so that it is determined that all the regions of the graphic data have been generated. In step S107, the generation stop instruction unit 112 outputs the graphic generation stop instructions 145 and 146 to the graphic generation units 106 and 122. The graphic generation unit 106 receives the graphic generation stop instruction 145 and stops the generation processing of the graphic data of the region E 136 that has been started in step S306. The graphic generation unit 122 receives the graphic generation stop instruction 146 and stops the generation processing of the graphic data of the region D 135 that has been started in step S205. In step S108, the processor 107 instructs the combination units 104 of the image processing chip A 101 and the image processing chip B 121 to start the combination processing of the image data and the graphic data. In the above-described processing, the processing in which the processor 107 receives the graphic generation completion notifications 143 and 144 represents a processing example of a receiving unit.

Figure 3:
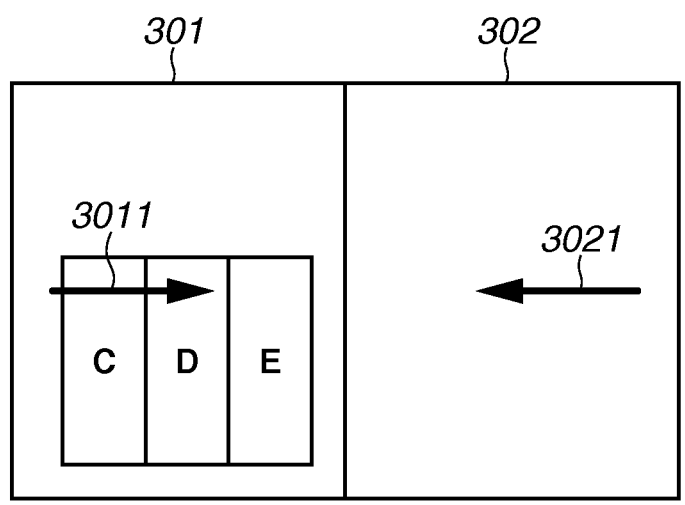
FIG. 3 is a diagram illustrating a method for determining a generation order of graphic data by using two image processing chips.

Hereinafter, a determination method of the graphic data generation order executed by the order determination unit 111 according to the present exemplary embodiment will be specifically described with reference to FIGS. 3 and 4. FIG. 3 is a diagram illustrating a first example of the determination method of the graphic data generation order according to the present exemplary embodiment.

As illustrated in FIG. 3, in the first example, it is determined that respective regions of the graphic data in a left-side display image data 301 (corresponding to the left-side display image data 138 of FIG. 1) are generated in the order from the left side to the right side as indicated by an arrow 3011. On the other hand, it is determined that respective regions of the graphic data in a right-side display image data 302 (corresponding to the right-side display image data 139 of FIG. 1) are generated in the order from the right side to the left side as indicated by an arrow 3021. Accordingly, the graphic generation unit 106 of the image processing chip A 101, which processes the left-side display image data 301, generates the graphic data in the order of a region C, a region D, and a region E. On the other hand, the graphic generation unit 122 of the image processing chip B 121, which processes the right-side display image data 302, generates the graphic data in the order of the region E, the region D, and the region C.

Figure 4:
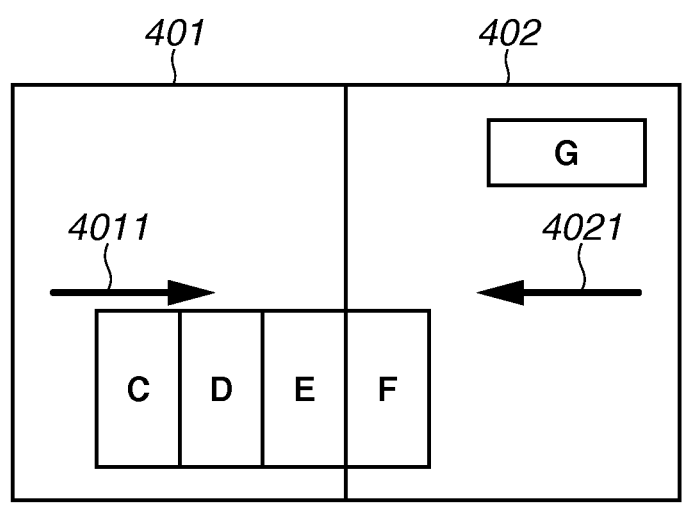
FIG. 4 is a diagram illustrating a method for determining a generation order of graphic data by using two image processing chips.

FIG. 4 is a diagram illustrating a second example of the determination method of the graphic data generation order according to the present exemplary embodiment. As illustrated in FIG. 4, in the second example, it is determined that respective regions of the graphic data in a left-side display image data 401 (corresponding to the left-side display image data 138 of FIG. 1) are generated in the order from the left side to the right side as indicated by an arrow 4011. On the other hand, it is determined that respective regions of the graphic data in a right-side display image data 402 (corresponding to the right-side display image data 139 of FIG. 1) are generated in the order from the right side to the left side as indicated by an arrow 4021. Accordingly, the graphic generation unit 106 of the image processing chip A 101, which processes the left-side display image data 401, generates the graphic data in the order of a region C, a region D, a region E, a region F, and a region G. On the other hand, the graphic generation unit 122 of the image processing chip B 121, which processes the right-side display image data 402, generates the graphic data in the order of the region G, the region F, the region E, the region D, and the region C.

In the above-described exemplary embodiment, two image processing chips concurrently processes divided regions of image data by spatially dividing the high-definition image data into two regions such as the right-half and the left-half regions as an example. Subsequently, a configuration will be described in which three image processing chips concurrently process three divided regions of image data by spatially dividing the high-definition image data into three regions. In other words, in the present exemplary embodiment, as described below the three divided regions of the image data will be processed by an image processing system where a chip equivalent to the image processing chip B 121 is added to the configuration illustrated in FIG. 1.

Figure 5:
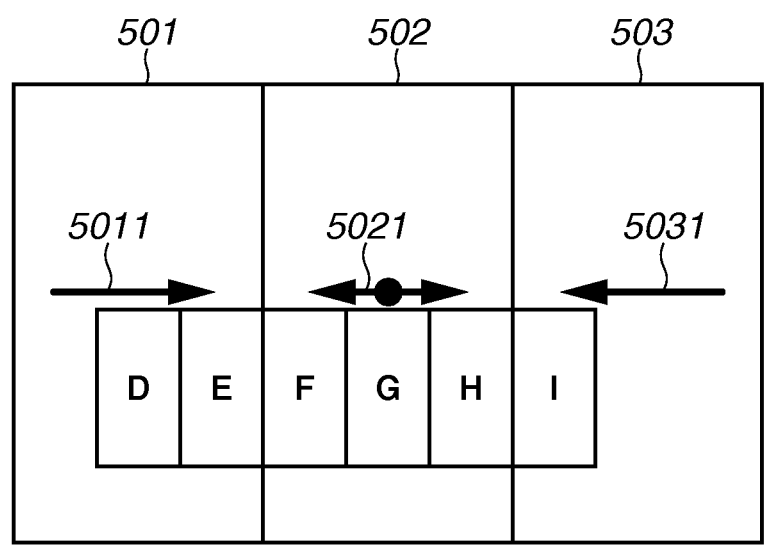
FIG. 5 is a diagram illustrating a method for determining a generation order of graphic data by using three image processing chips.

FIG. 5 is a diagram illustrating an example of the determination method of the graphic data generation order using three image processing chips. In the present exemplary embodiment, as illustrated in FIG. 5, the high-definition image data is vertically divided into left-side display image data 501, central display image data 502, and right-side display image data 503.

It is determined that respective regions of the graphic data in the left-side display image data 501 are generated in the order from the left side to the right side as indicated by an arrow 5011. It is determined that respective regions of the graphic data in the central display image data 502 are generated in the order from the center to the left side and the right side as indicated by an arrow 5021. It is determined that respective regions of the graphic data in the right-side display image data 503 are generated in the order from the right side to the left side as indicated by an arrow 5031.

Accordingly, the graphic generation unit of the image processing chip which processes the left-side display image data 501 generates the graphic data in the order of a region D, a region E, a region F, a region G, a region H, and a region I. Further, the graphic generation unit of the image processing chip which processes the central display image data 502 generates the graphic data in the order of the region G, the region F, the region H, the region E, the region I, and the region D. Furthermore, the graphic generation unit of the image processing chip which processes the right-side display image data 503 generates the graphic data in the order of the region I, the region H, the region G, the region F, the region E, and the region D.

Subsequently, a configuration will be described in which four image processing chips concurrently processes four divided regions of image data by spatially dividing the high-definition image data into four regions. In other words, in the present exemplary embodiment, the configuration will be described in which the above-described four divided regions of image data is processed by an image processing system where two chips equivalent to the image processing chip B 121 are added to the configuration illustrated in FIG. 1.

Figure 6:
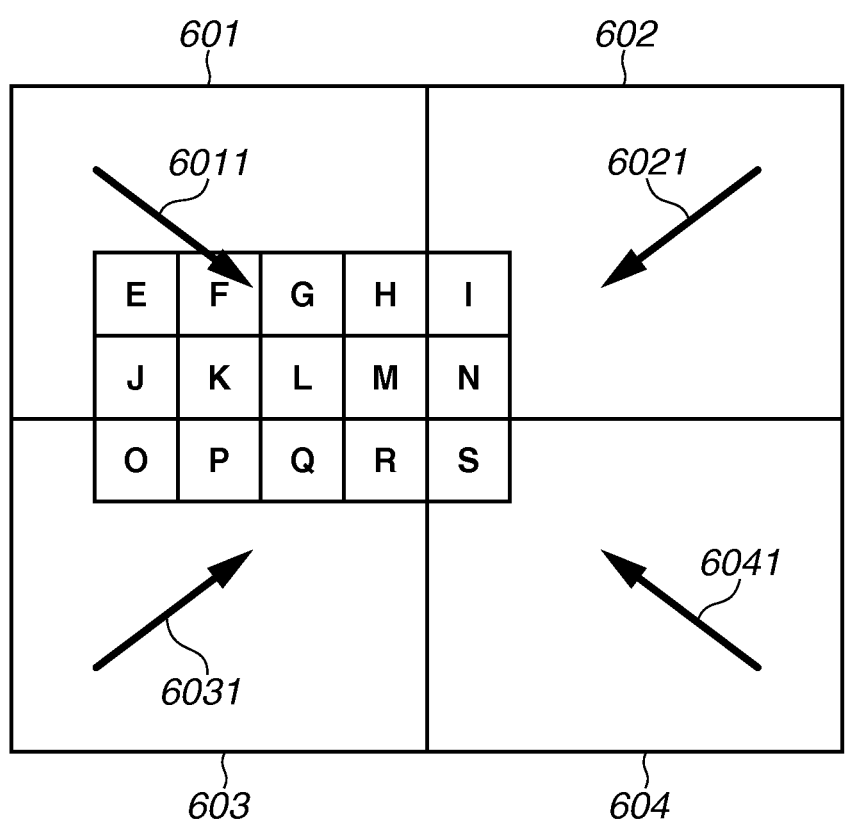
FIG. 6 is a diagram illustrating a method for determining a generation order of graphic data by using four image processing chips.

FIG. 6 is a diagram illustrating an example of the determination method of the graphic data generation order using four image processing chips. In the present exemplary embodiment, as illustrated in FIG. 6, the high-definition image data is divided in a grid-like manner, i.e., upper-left display image data 601, upper-right display image data 602, lower-left display image data 603, and lower-right display image data 604.

It is determined that respective regions of the graphic data in the upper-left display image data 601 are generated in the order from the upper-left to the center as indicated by an arrow 6011. It is determined that respective regions of the graphic data in the upper-right display image data 602 are generated in the order from the upper-right to the center as indicated by an arrow 6021. It is determined that respective regions of the graphic data in the lower-left display image data 603 are generated in the order from the lower-left to the center as indicated by an arrow 6031. It is determined that respective regions of the graphic data in the lower-right display image data 604 are generated in the order from the lower-right to the center as indicated by an arrow 6041.

Accordingly, the graphic generation unit of the image processing chip which processes the upper-left display image data 601 generates the graphic data in the order of a region E, a region F, a region G, a region J, a region K, a region H, a region L, a region M, a region O, a region P, a region I, a region Q, a region N, a region R, and a region S. Further, the graphic generation unit of the image processing chip which processes the upper-right display image data 602 generates the graphic data in the order of the region I, the region N, the region H, the region M, the region S, the region R, the region G, the region L, the region Q, the region F, the region K, the region P, the region E, the region J, and the region O. Further, the graphic generation unit of the image processing chip which processes the lower-left display image data 603 generates the graphic data in the order of the region O, the region P, the region Q, the region R, the region J, the region K, the region L, the region S, the region M, the region N, the region E, the region F, the region G, the region H, and the region I. Furthermore, the graphic generation unit of the image processing chip which processes the lower-right display image data 604 generates the graphic data in the order of the region S, the region N, the region R, the region I, the region M, the region Q, the region H, the region L, the region P, the region G, the region K, the region O, the region F, the region J, and the region E.

Subsequently, a configuration will be described in which nine image processing chips concurrently processes nine divided regions of image data by spatially dividing the high-definition image data into nine regions.

Figure 7:
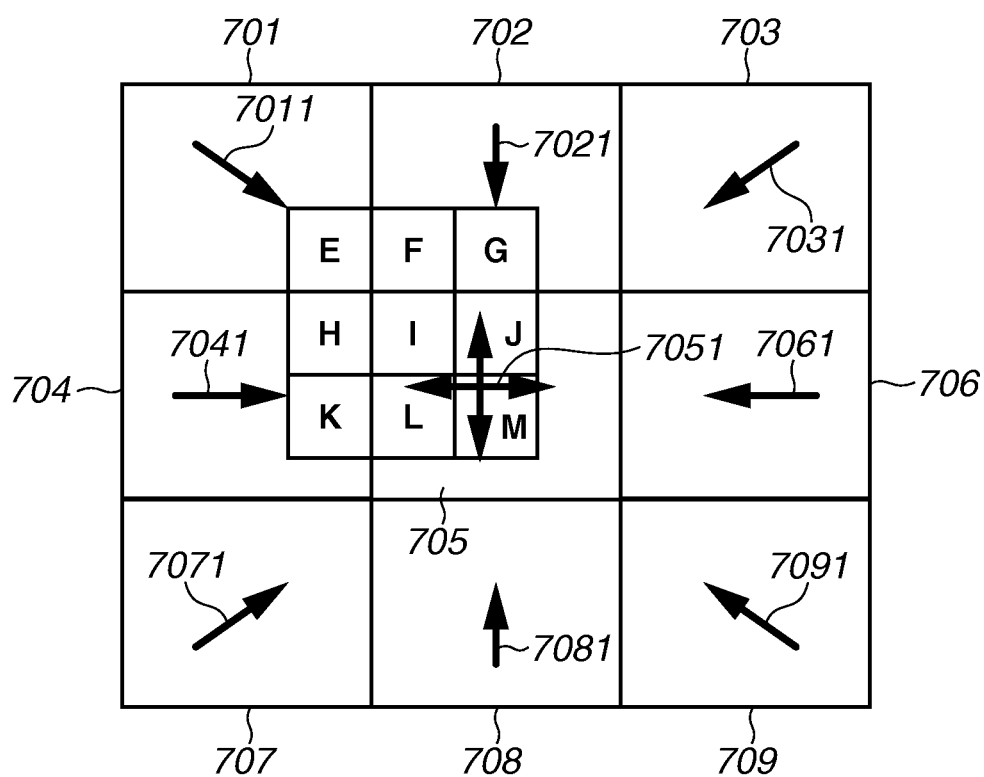
FIG. 7 is a diagram illustrating a method for determining a generation order of graphic data by using nine image processing chips.

FIG. 7 is a diagram illustrating an example of the determination method of the graphic data generation order using nine image processing chips.

In FIG. 7, each of divided regions of image data 701, 702, 703, 704, 706, 707, 708, and 709 has both a boundary between the image data and a boundary between divided regions. Accordingly, generation processing of respective regions of graphic data is executed from a region at the boundary between the image data toward a region at the boundary between divided regions as indicated by each of arrows 7011, 7021, 7031, 7041, 7061, 7071, 7081, and 7091. However, image data 705 does not have a boundary between the image data. In this case, generation processing of respective regions of graphic data is executed from a region at the center of the image data toward regions at the boundaries of divided regions as indicated by an arrow 7051.

Therefore, the graphic generation unit of the image processing chip which processes the image data 701 generates the graphic data in the order of a region E, a region F, a region H, a region I, a region G, a region K, a region J, a region L, and a region M. The graphic generation unit of the image processing chip which processes the image data 702 generates the graphic data in the order of the region G, the region F, the region J, the region I, the region E, the region H, the region M, the region L, and the region K. The graphic generation unit of the image processing chip which processes the image data 703 generates the graphic data in the order of the region G, the region J, the region F, the region I, the region E, the region M, the region L, the region H, and the region K. The graphic generation unit of the image processing chip which processes the image data 704 generates the graphic data in the order of the region K, the region H, the region E, the region L, the region I, the region F, the region M, the region J, and the region G. The graphic generation unit of the image processing chip which processes the image data 705 generates the graphic data in the order of the region M, the region J, the region L, the region I, the region G, the region K, the region F, the region H, and the region E. The graphic generation unit of the image processing chip which processes the image data 706 generates the graphic data in the order of the region M, the region J, the region G, the region L, the region I, the region F, the region K, the region H, and the region E. The graphic generation unit of the image processing chip which processes the image data 707 generates the graphic data in the order of the region K, the region L, the region H, the region I, the region M, the region E, the region J, the region F, and the region G. The graphic generation unit of the image processing chip which processes the image data 708 generates the graphic data in the order of the region M, the region L, the region K, the region J, the region I, the region H, the region G, the region F, and the region E.

The graphic generation unit of the image processing chip which processes the image data 709 generates the graphic data in the order of the region M, the region J, the region L, the region I, the region G, the region K, the region F, the region H, and the region E.

In the above-described exemplary embodiment, the processing load of the graphic generation can be uniform among the graphic generation units of a plurality of the image processing chips while the graphic data transfer with respect to other image processing chips can be also reduced. Accordingly, time taken to practically output the image data on which the graphic data is superimposed after receiving the graphic data generation instruction can be shortened. Further, when animation is to be displayed, display speed (i.e., update rate) of the graphic data can be quickened as much as possible.

A unit of graphic data division suitable for the graphic data may vary depending on various factors such as a size of the graphic data, a processing capacity of the graphic generation unit, communication overhead between the graphic generation unit and the processor, and band and latency for transferring data to a memory. Therefore, the unit of the graphic data division is not seen to be limited a particular unit.

According to the aspect of the present disclosure, display speed of the graphic data can be improved. Further, in the present exemplary embodiment, a configuration has been mainly described in which a plurality of image processing chips is included in an image processing apparatus. However, the configuration is not limited thereto. For example, in a configuration according to another exemplary embodiment, a first image processing apparatus includes the image processing chip A whereas a second image processing apparatus includes the image processing chip B.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-185312 filed Sep. 6, 2013, which is hereby incorporated by reference herein in its entirety.

What is claimed is:

1. An image processing apparatus controlling generation of image data, comprising:
    a division unit configured to divide a graphic region corresponding to a graphic image to be displayed into a plurality of divided regions;
    a determination unit configured to determine a generation order of the graphic image such that, in a case where the graphic region is positioned across a first region and a second region, a first generation unit generates image data to be displayed on the first region and a graphic image of at least one divided region to be displayed on the first region and a second generation unit generates image data to be displayed on the second region and a graphic image of at least one divided region to be displayed on the second region, wherein a first generation order of the graphic image for the first generation unit and a second generation order of the graphic image for the second generation unit are different from each other; and
    a control unit configured to control the first and the second generation units to generate the graphic image such that the first generation unit generates the graphic image based on the determined generation order for the first generation unit and the second generation unit generates the graphic image based on the determined generation order for the second generation unit.

2. The image processing apparatus according to claim 1, wherein, in a case where the division unit divides the graphic region into a first divided region, a second divided region adjacent to the first divided region, and a third divided region adjacent to the second divided region but not adjacent to the first divided region, the determination unit determines the first and the second generation orders so as to cause the first generation unit to generate the graphic image in an order of the first divided region, the second divided region, and the third divided region, and the second generation unit to generate the graphic image in an order of the third divided region, the second divided region, and the first divided region.

3. The image processing apparatus according to claim 2, wherein the first generation unit generates the image data to be displayed on the first region based on first input image data input from an external device, and the second generation unit generates the image data to be displayed on the second region based on second input image data input from an external device.

4. The image processing apparatus according to claim 1, further comprising:
a receiving unit configured to receive completion notifications from the first and the second generation units indicating that generation of the graphic image in the regions divided by the division unit has completed;
wherein the control unit decides, based on receipt of a plurality of completion notifications corresponding to a plurality of the regions divided by the division unit, that the graphic image combining the graphic image generated by the first generation unit with the graphic image generated by the second generation unit corresponds to the graphic image to be displayed.

5. The image processing apparatus according to claim 1, wherein, in a case where the division unit divides the graphic image into a first divided region, a second divided region adjacent to the first divided region, and a third divided region adjacent to the second divided region but not adjacent to the first divided region, the determination unit determines a generation order of a plurality of the divided regions of the graphic image so as to cause the first generation unit to generate the graphic image in an order of the first divided region, the second divided region, and the third divided region, the second generation unit to generate the graphic image in an order of the second divided region, the first divided region, and the third divided region, and a third generation unit to generate the graphic image in an order of the third divided region, the second divided region, and the first divided region.

6. The image processing apparatus according to claim 1, wherein, when the control unit decides that the graphic image combining the graphic image generated by the first generation unit with the graphic image generated by the second generation unit corresponds to the graphic image to be displayed, the control unit controls generation of the graphic image so as to cause the first generation unit not to generate graphic image that is to be displayed but has not yet been generated by the first generation unit, and the second generation unit not to generate graphic image that is to be displayed but has not yet been generated by the second generation unit.

7. The image processing apparatus according to claim 1, further comprising:
an acquisition unit configured to acquire image data input from an external device; and
a display control unit configured to display an image based on the image data generated by the first and the second generation units and the input image data acquired by the acquisition unit.

8. The image processing apparatus according to claim 1, wherein the determination unit determines the first and second generation order such that a graphic image of a divided region corresponding to a central part of a display screen is generated earlier than a graphic image of a divided region corresponding to an edge part of the display screen.

9. A control method for controlling generation of image data comprising:
dividing a graphic region corresponding to a graphic image to be displayed into a plurality of divided regions;
determining a generation order of the graphic image such that, in a case where the graphic region is positioned across a first region and a second region, a first generation unit generates image data to be displayed on the first region and a graphic image of at least one divided region to be displayed on the first region and a second generation unit generates image data to be displayed on the second region and a graphic image of at least one divided region to be displayed on the second region, wherein a first generation order of the graphic image for the first generation unit and a second generation order of the graphic image for the second generation unit are different from each other; and
controlling the first and the second generation units to generate the image data until the graphic image such that the first generation unit generates the graphic image based on the determined generation order for the first generation unit and the second generation unit generates the graphic image based on the determined generation order for the second generation unit.

10. The control method according to claim 9, wherein, in a case where the graphic region is divided into a first divided region, a second divided region adjacent to the first divided region, and a third divided region adjacent to the second divided region but not adjacent to the first divided region, the first and the second generation orders are determined so as to cause the first generation unit to generate the graphic image in an order of the first divided region, the second divided region, and the third divided region, and the second generation unit to generate the graphic image in an order of the third divided region, the second divided region, and the first divided region.

11. The control method according to claim 10, wherein the first generation unit generates the image data to be displayed on the first region based on first image data input from an external device, and the second generation unit generates the image data to be displayed on the second region based on second image data input from an external device.

12. The control method according to claim 9, further comprising:
receiving completion notifications from the first and the second generation units indicating that generation of the divided regions of the graphic image has completed;
wherein combining, based on receipt of a plurality of completion notifications corresponding to a plurality of the regions that are divided, the graphic image generated by the first generation unit with the graphic image generated by the second generation unit corresponds to the graphic image to be displayed.

13. The control method according to claim 9, wherein, in a case where the graphic image is divided into a first divided region, a second divided region adjacent to the first divided region, and a third divided region adjacent to the second divided region but not adjacent to the first divided region, determining a generation order of a plurality of the divided regions of the graphic image so as to cause the first generation unit to generate the graphic image in an order of the first divided region, the second divided region, and the third divided region, the second generation unit to generate the graphic image in an order of the second divided region, the first divided region, and the third divided region, and a third generation unit to generate the graphic image in an order of the third divided region, the second divided region, and the first divided region.

14. The control method according to claim 9, wherein, in a case where it is decided that the graphic image combining the graphic image generated by the first generation unit with the graphic image generated by the second generation unit corresponds to the graphic image to be displayed, generation of the graphic image is controlled so as to cause the first generation unit not to generate the graphic image to be displayed that has not yet been generated by the first generation unit, and the second generation unit not to generate the graphic image to be displayed that has not yet been generated by the second generation unit.

15. The control method according to claim 9, further comprising:
acquiring input image data input from an external device; and
controlling and displaying an image based on the image data generated by the first and the second generation units and the acquired input image data.

16. A non-transitory computer readable storage medium storing a program for causing a computer to execute a control method for controlling generation of image data, the control method comprising:
dividing a graphic region corresponding to a graphic image to be displayed into a plurality of divided regions;
determining a generation order of the graphic image so as, in a case where the graphic region is positioned across a first region and a second region, to make a first generation unit generate image data to be displayed on the first region and a graphic image of at least one divided region to be displayed on the first region and a second generation unit generates image data to be displayed on the second region and a graphic image of at least one divided region to be displayed on the second region, wherein a first generation order of the graphic image for the first generation unit and a second generation order of the graphic image for the second generation unit different from each other; and
controlling the first and the second generation units to generate the graphic image such that the first generation unit generates the graphic image based on the determined generation order for the first generation unit and the second generation unit generates the graphic image based on the determined generation order for the second generation unit.

17. The non-transitory computer readable storage medium according to claim 16,
wherein, in a case where the graphic region is divided into a first divided region, a second divided region adjacent to the first divided region, and a third divided region adjacent to the second divided region but not adjacent to the first divided region, the first and the second generation orders are determined so as to cause the first generation unit to generate the graphic image in an order of the first divided region, the second divided region, and the third divided region, and the second generation unit to generate the graphic image in an order of the third divided region, the second divided region, and the first divided region.

18. The non-transitory computer readable storage medium according to claim 17,
wherein the first generation unit generates the image data to be displayed on the first region based on first input image data input from an external device, and the second generation unit generates the image data to be displayed on the second region based on second input image data input from an external device.

* * * * *